(12) United States Patent
Moon

(10) Patent No.: US 11,602,013 B2
(45) Date of Patent: Mar. 7, 2023

(54) POWER SUPPLY AND TEMPERATURE CONTROL ASSEMBLY FOR AN ELECTRIC APPLIANCE

(71) Applicant: NuWave, LLC, Libertyville, IL (US)

(72) Inventor: Jung S. Moon, Long Grove, IL (US)

(73) Assignee: NuWave, LLC, Vernon Hills, IL (US)

( * ) Notice: Subject to any disclaimer, the term of this patent is extended or adjusted under 35 U.S.C. 154(b) by 1006 days.

(21) Appl. No.: 16/296,591

(22) Filed: Mar. 8, 2019

(65) Prior Publication Data
US 2019/0281663 A1   Sep. 12, 2019

Related U.S. Application Data

(60) Provisional application No. 62/640,669, filed on Mar. 9, 2018.

(51) Int. Cl.
| | |
|---|---|
| *H05B 1/02* | (2006.01) |
| *H01R 13/04* | (2006.01) |
| *A47J 36/32* | (2006.01) |
| *H01R 13/66* | (2006.01) |
| *A47J 27/00* | (2006.01) |
| *H01R 13/10* | (2006.01) |

(52) U.S. Cl.
CPC .......... *H05B 1/0258* (2013.01); *A47J 27/004* (2013.01); *A47J 36/32* (2013.01); *H01R 13/04* (2013.01); *H01R 13/10* (2013.01); *H01R 13/6683* (2013.01)

(58) Field of Classification Search
CPC .... H05B 1/0216; H05B 1/0258; A47J 37/105; A47J 36/32; A47J 27/004; H01R 13/7137; H01R 13/04; H01R 13/10; H01R 13/6683

USPC .......... 439/928, 485; 219/441; 337/372, 377
See application file for complete search history.

(56) References Cited

U.S. PATENT DOCUMENTS

| | | | | |
|---|---|---|---|---|
| 2,830,166 | A * | 4/1958 | Loomis | H01R 13/7137 337/392 |
| 2,936,359 | A * | 5/1960 | Sheahan | H01R 13/7137 337/380 |
| 6,002,115 | A * | 12/1999 | McClean | A47J 37/105 219/508 |
| 2019/0159288 | A1* | 5/2019 | Warwick | H05B 3/68 |

* cited by examiner

*Primary Examiner* — Gary F Paumen
(74) *Attorney, Agent, or Firm* — Bishop, Diehl & Lee, Ltd.

(57) ABSTRACT

An electrical appliance comprising a heating element, the heating element including a heating wire, the heating wire encased within an iron shell, the iron shell having an exterior surface, and a first coating layer disposed on the exterior surface of the shell, wherein the first coating layer is stainless steel. The appliance also includes a power supply. The power supply includes a heating element, a temperature sensor to sense the temperature of the appliance, and a temperature controller in communication with the temperature sensor to maintain the appliance within a desired temperature range. The power supply also includes at least one electrical contact rod operatively engaged with the appliance to supply electrical power to the heating element, and at least one contact receptacle adapted to accept the at least one electrical contact rod. The at least one contact receptacle has a length proportional to the electrical power supplied to the appliance to prevent overheating of the power supply.

15 Claims, 6 Drawing Sheets

POWER SUPPLY AND TEMPERATURE CONTROL ASSEMBLY FOR AN ELECTRIC APPLIANCE

RELATED APPLICATION(S)

The present application claims the filing priority of U.S. Provisional Application No. 62/640,669 titled "Electrical Appliance Power Supply" and filed on Mar. 9, 2018.

TECHNICAL FIELD OF THE INVENTION

The present invention relates to a temperature controller and power supply for an electric appliance. More specifically, the invention relates to an assembly of an electric heating element and temperature control assembly used for a cooking appliance.

BACKGROUND OF THE INVENTION

Electrical consumer household cooking appliances are present in nearly every home. Such appliances include fryers, electric woks, ovens, electric skillets, electric griddles, and the like. These appliances all require a heating source. Many such appliances use a heating element. This heating element generally includes an iron-encased electrical wire which is coated with copper to improve conductivity. However, after repeated uses, the copper coating on the wire eventually degrades, thereby exposing the iron beneath. Exposing the iron creates a number of potential problems, including but not limited to, rusting, pitting, and the creation of small holes in the iron casing that could eventually expose the internal heating wire encased therein to contaminants such as food particles or water. This degraded condition can lead to a catastrophic failure of the heating element.

To solve the heating element degradation issue, a stainless steel coating over the iron encasement is used instead of a copper. The stainless steel coating is far more resistant to the degradation associated with the use of a copper coating. However, due to decreased conductivity and increased insulating properties of stainless steel, the time needed for the resulting heating element to reach a desired temperature also increases. The result is an increase in electrical demand and an overheated power supply, causing the power supply to shut down electrical power to the appliance. Obviously, this is an undesirable event.

The present invention provides an improved electrical appliance heating element and power supply that avoids the degradation of the heating element while also preventing overheating of the power supply.

Until the invention of the present application, these and other problems in the prior art went either unnoticed or unsolved by those skilled in the art. The present invention provides an electrical appliance power supply which performs multiple functions with the associated appliance without sacrificing safety, effectiveness or affordability.

SUMMARY OF THE INVENTION

There is disclosed herein an improved electric temperature control and power supply assembly which avoids the disadvantages of prior devices while affording additional structural and operating advantages.

Generally speaking, an electrical heating assembly for an cooking appliance comprises a heating element positioned within the cooking appliance and comprising at least one electrical contact rod having a length and extending from the appliance, and a temperature controller having a temperature sensor and at least one electrical contact receptacle configured to accept the at least one electrical contact rod to form an electrical connection. The temperature sensor extends from the controller and is configured to contact and measure a temperature of the appliance. The temperature controller also has a power cord for connecting to an electric power source. Electric power is supplied to the heating element from the power source via the electrical connection in the temperature controller and the at least one contact receptacle has a length proportional to the electric power supplied to the appliance to prevent overheating of any part of the electrical heating assembly.

In a specific embodiment, the heating element comprises a wire encased within an iron material to form an iron rod having an exterior surface, and a stainless steel coating layer disposed on the exterior surface of the iron rod. Preferably, the length of the at least one contact receptacle is approximately twice to three times the length of the at least one contact rod.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings and photographs, embodiments thereof, from an inspection of which, when considered in connection with the following description, the subject matter sought to be protected, its construction and operation, and many of its advantages should be readily understood and appreciated.

DETAILED DESCRIPTION OF A PREFERRED EMBODIMENT OF THE INVENTION

Figure 1:
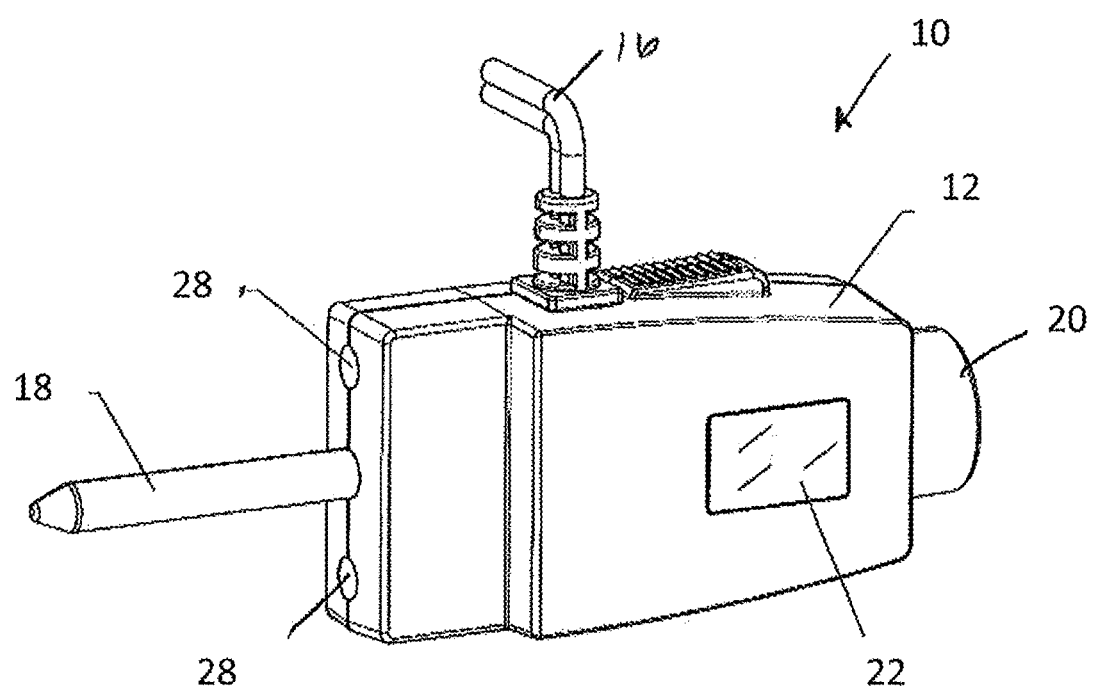
FIG. 1 is a perspective view of an embodiment of an electric appliance power supply and temperature controller in accordance with the present disclosure.

While this invention is susceptible of embodiments in many different forms, there is shown in the drawings and will herein be described in detail at least one preferred embodiment of the invention with the understanding that the present disclosure is to be considered as an exemplification of the principles of the invention and is not intended to limit the broad aspect of the invention to any of the specific embodiments illustrated.

While the figures show the present invention used in connection with an electric skillet, it will be understood that it can be used with any electric, temperature-controlled, heat-generating appliance. Such appliances include, but are not limited to, grill, waffle maker, slow cooker, crock pot, toaster oven, deep fryer, and the like. In use, the power supply 10 engages with the appliance 30 to supply AC power to the heating element.

Referring to FIGS. 1-6, there is illustrated an improved electrical appliance power supply 10 in accordance with an embodiment of the present invention. The power supply 10 includes an outer housing 12 for encasing control circuitry 14 on a circuit board 15, an AC power cord 16, a conductive connector 18 extending from a first end of the power supply 10, and a cooking temperature control knob 20 extending from a second end of the power supply 10. The control knob 20 can also function as an on/off switch for the appliance. The outer housing 12 includes a temperature viewing window 22 for viewing a selected cooking temperature as determined by the control knob 20. It will be understood that the temperature of the appliance can be digitally controlled as shown in this embodiment, or by any other suitable means.

In a preferred embodiment, the conductive connector 18 comprises a hollow body 50 having sensor wires 24 extending into the hollow body 50 toward a tip 52 of the connector 18. The sensor wires 24 are used to sense and regulate the cooking temperature of the particular appliance being used. The sensor wires 24 extend back into housing 54 and attach to control circuitry 14. The control circuitry 14 is configured to control the power supply 10 to achieve the selected cooking temperature.

Figure 2:
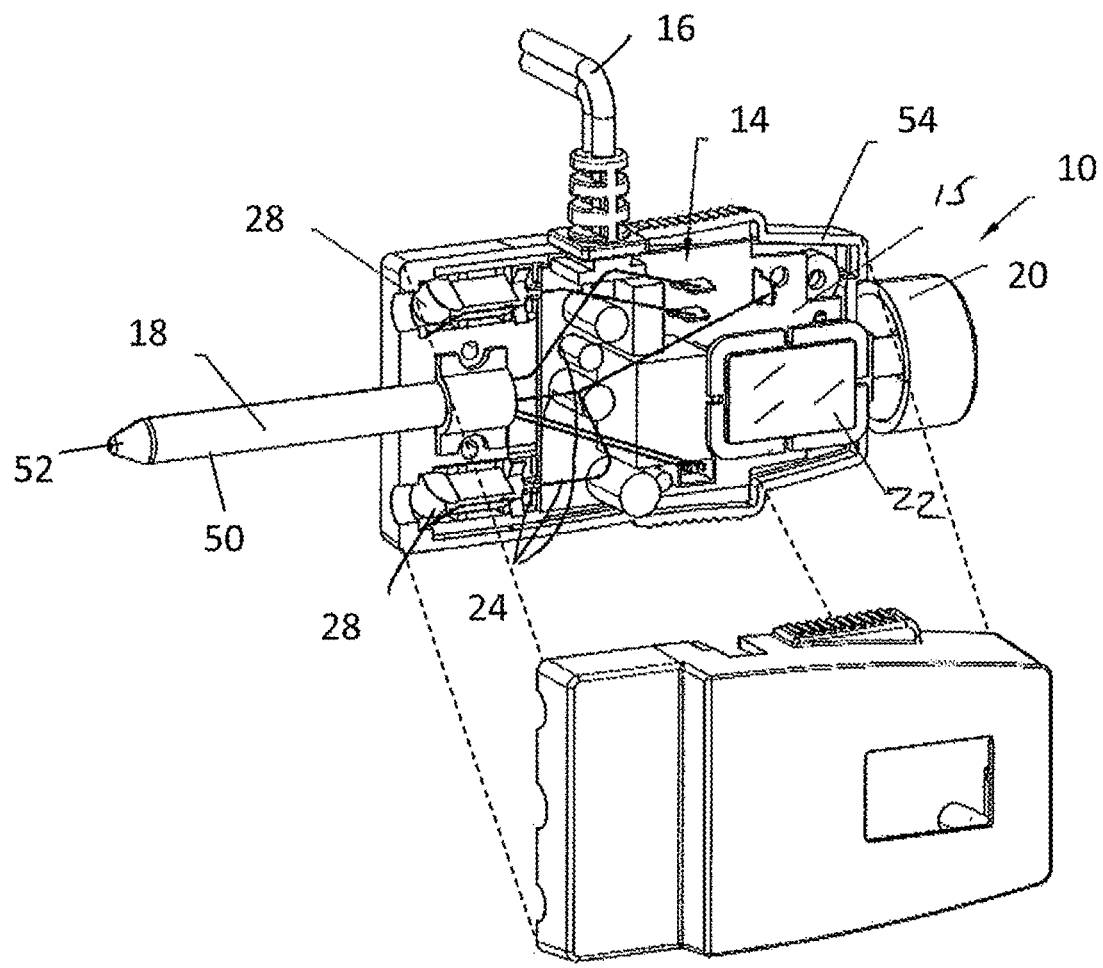
FIG. 2 is a perspective interior view of the embodiment illustrated in FIG. 1.
Figure 3:
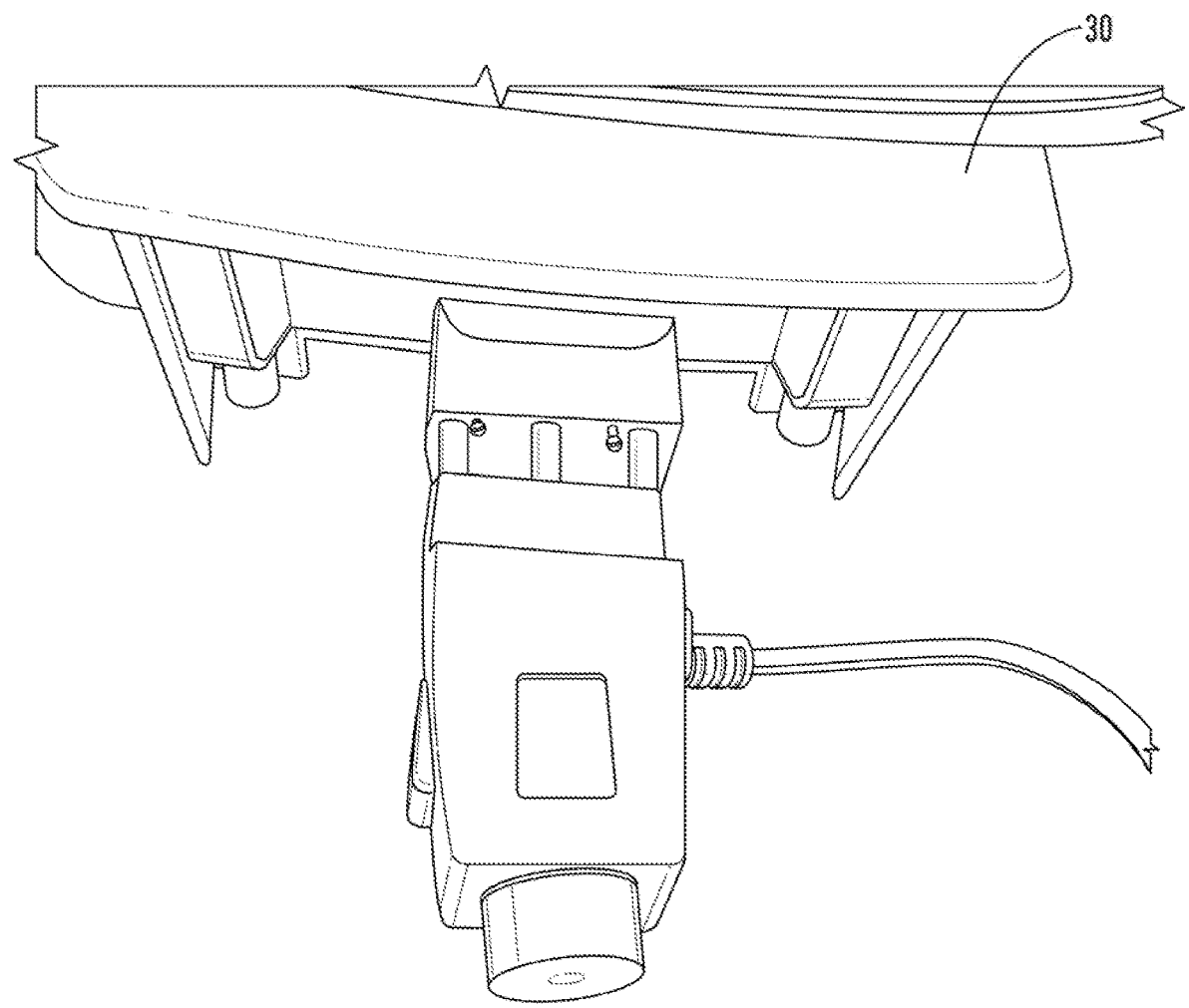
FIG. 3 is a top view of an embodiment of a power supply and temperature controller being connected with the heating element of a cooking appliance.
Figure 4:
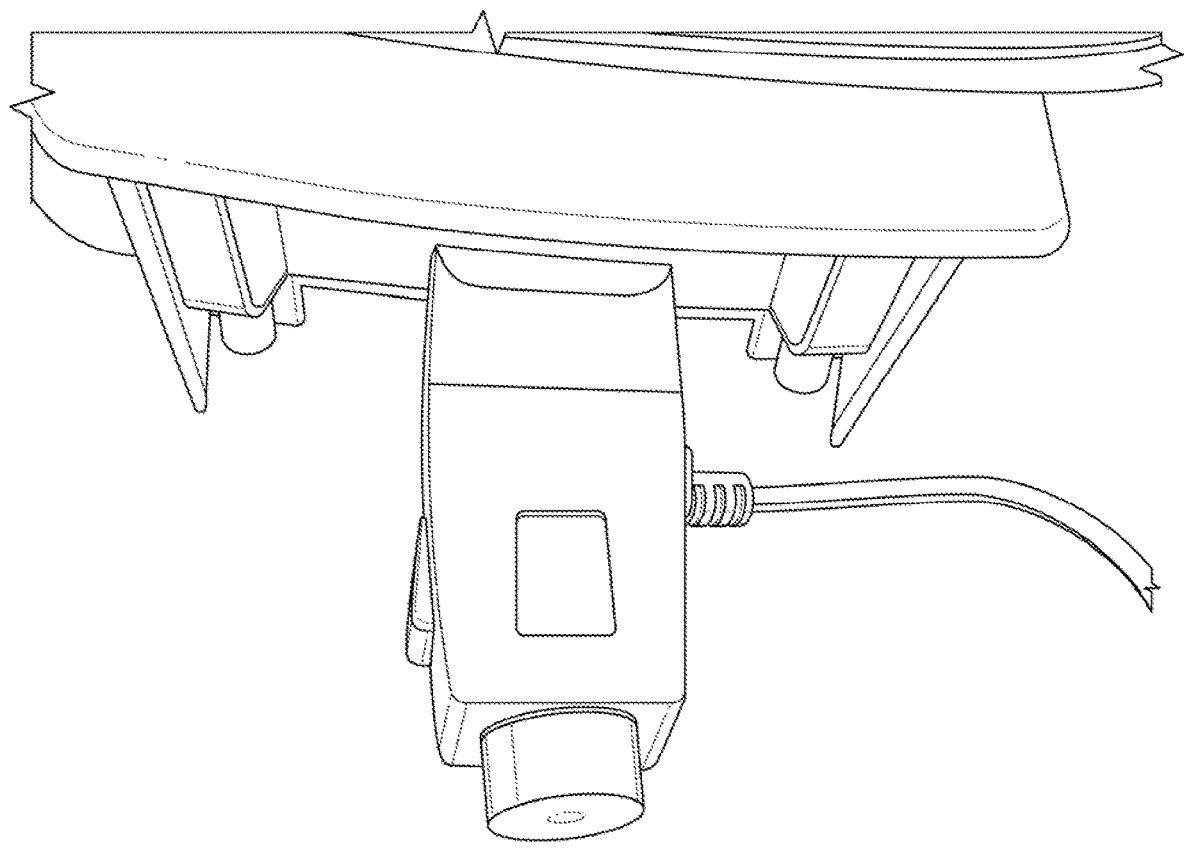
FIG. 4 is another top view of the components of FIG. 3 showing the electric power supply and temperature controller operatively engaged with the heating element of the cooking appliance.
Figure 5:
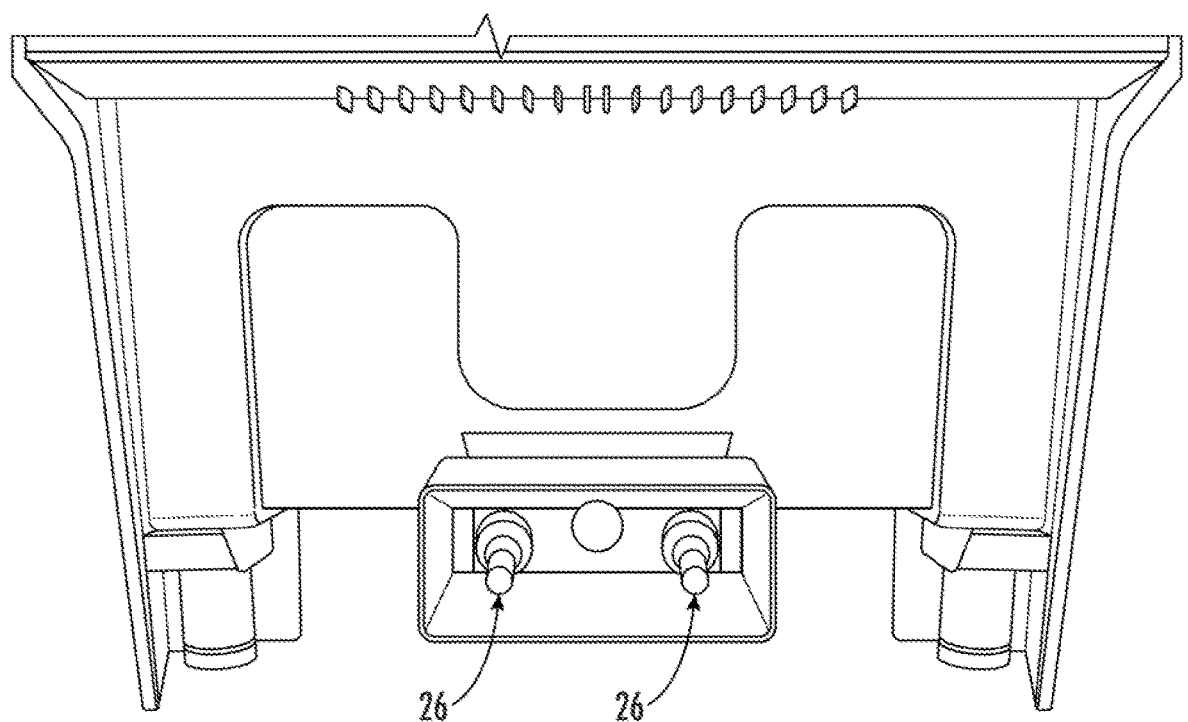
FIG. 5 is an elevated side view of an embodiment of connecting rods for a heating element of an electric cooking appliance.

As shown in FIG. 2, the power supply 10 also includes contact receptacles 28 for receiving contact rods 26 of an appliance 30. The contact rods 26 (FIG. 5) are typically made of steel, but can be made of any suitable material. The contact receptacles 28 are typically lined with brass, but also made be made of any suitable material. The receptacles 28 receive the rods 26, thereby creating an electrical connection.

Figure 6:
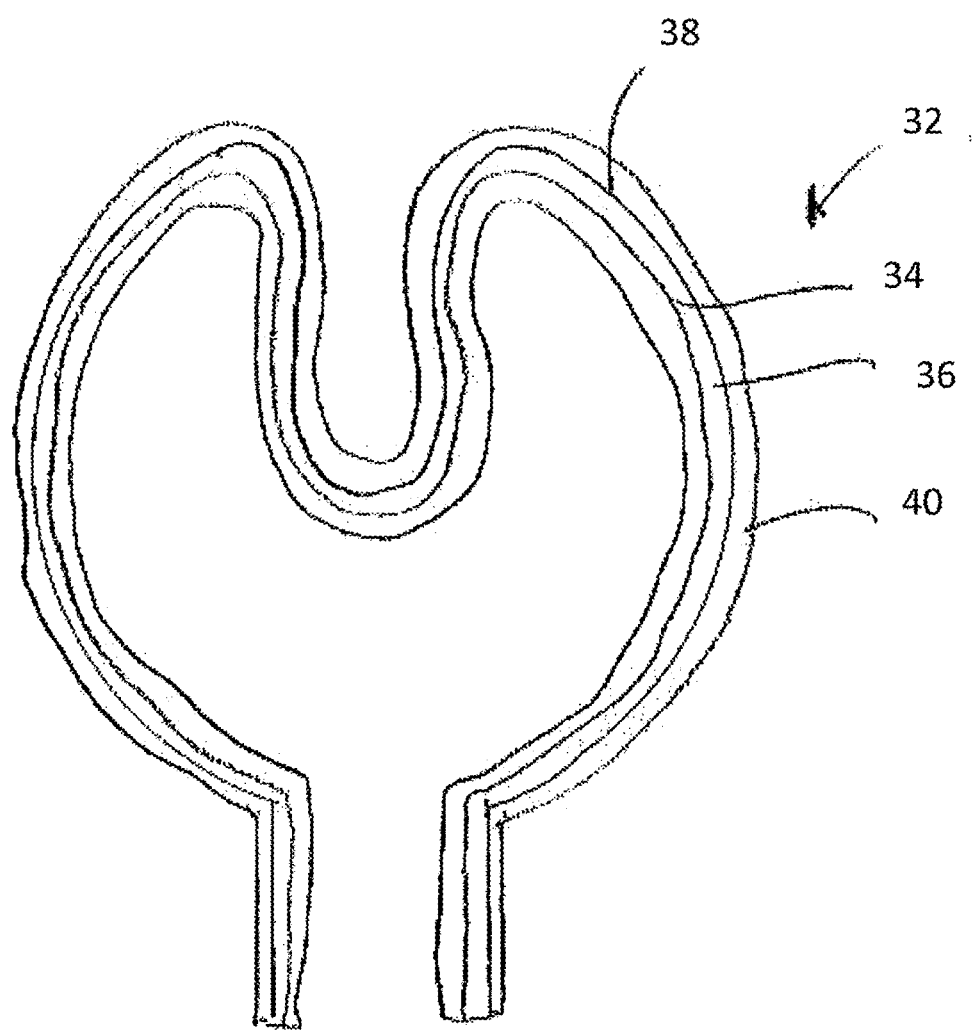
FIG. 6 is a schematic of an embodiment of a heating element in accordance with the present disclosure.

FIG. 6 shows a heating element 32 in accordance with an embodiment of the present invention. The heating element 32 shown is typical of that used to heat the cooking surface of an electric skillet, though other cooking/heating appliances may also have a similar heating element 32 for heating a surface, air or a liquid used for cooking. The ends of the heating element 32 extend from a base of the appliance 30 as contact rods 26, The heating element 32 is comprised of a heating wire 34 made of a suitable wire gauge. The wire 34 is initially encased by iron to form a rod 36 which can be bent to a desired shape for the heating element 32. The resulting iron rod 36 has a first exterior surface 38 which is given a stainless steel coating 40. One skilled in the art will be able to determine a suitable thickness of the coating depending on the intended application or use and other pertinent factors.

Once coupled together—i.e., the heating element 32 via contact rods 26 and the power source 10 via contact receptacles 28—the heating element 32 is operatively engaged with the power supply 10 to accept electrical power and create the selected cooking temperature.

In a typical electric skillet, the length of contact rods 26 are in the range of approximately one-half to three-quarters inches long (approximately, 1.27 to 1.91 cm). As previously noted, the electrical delivery burden of these connectors (rods 26 and receptacles 28) when coated in stainless steel causes overheating in the power supply 10.

To address this issue, embodiments of the present invention, have increased the contact area of the connectors. That is, the rods 26 and receptacles 28 are increased to a length, and therefore, a surface area necessary to prevent excessive heating of the power supply 10 when using the stainless steel-coated heating element 32. The increased length and contacting surface area counter the increased time necessary to distribute heat to a cooking surface of the appliance 30 when a stainless steel coating 40 is used. The contact area between the external surface of the rods 26 and the internal surfaces of the receptacles 28 on the power supply 10 is proportional to the electrical power supplied to the appliance to prevent overheating of the power supply 10.

In a specific embodiment, the contact rods 26 from the heating element 32 and the receptacles 28 are increased as much as three times the length of current contacts rods 26—i.e., to a length and depth in a range of from approximately 1½ inches to approximately 2¼ inches (approximately 3.81 to 5.72 cm). The resulting increased contact area prevents the power supply unit 10 from overheating when using the stainless steel coating 40 on the iron rod 36 due to the greater surface area of contact between the contact rods 26 and contact receptacles 28.

For other appliances using a similar type of heating element, the length and surface area of the contacts are also proportionally increased two to three times their current length or surface area for a similar effect. The resulting appropriate length of the receptacles 28 would be determinable by one skilled in the art depending on the appliance and other relevant factors.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. An electrical heating assembly for a cooking appliance, the assembly comprising:
    a heating element positioned within the cooking appliance and comprising at least one electrical contact rod having a length and extending from the appliance; and
    a temperature controller having a temperature sensor and at least one electrical contact receptacle configured to accept the at least one electrical contact rod to form an electrical connection, wherein the temperature sensor extends from the controller and is configured to contact and measure a temperature of the appliance, the temperature controller having a power cord for connecting to an electric power source;
    wherein electric power is supplied to the heating element from the power source via the electrical connection in the temperature controller and the at least one contact receptacle has a length of approximately twice the length of the at least one contact rod to prevent overheating of any part of the electrical heating assembly.

2. The assembly of claim 1, wherein the heating element comprises:
    a wire encased within an iron material to form an iron rod having an exterior surface; and
    a stainless steel coating layer disposed on the exterior surface of the iron rod.

3. The assembly of claim 1, wherein the sensor is positioned within an end of a hollow body extending from the temperature controller.

4. The assembly of claim 1, wherein the length of the at least one contact receptacle is approximately three times the length of the at least one contact rod.

5. The assembly of claim 4, wherein the at least one contact receptacle is lined with a brass material.

6. An electrical heating assembly for a cooking appliance, the assembly comprising:
 a heating element positioned within the cooking appliance and comprising two electrical contact rods each having a length and extending from the appliance; and
 a temperature controller having a temperature sensor and two electrical contact receptacles configured to accept the two electrical contact rods to form an electrical connection, wherein the temperature sensor extends from the controller and is configured to contact and measure a temperature of the appliance, the temperature controller having a power cord for connecting to an electric power source;
 wherein electric power is supplied to the heating element from the power source via the electrical connection in the temperature controller and the two electrical contact receptacles each has a length at least twice the length of the two electrical contact rods to prevent overheating of any part of the electrical heating assembly.

7. The assembly of claim 6, wherein the length of each of the two electrical contact receptacles is approximately three times the length of each of the two electrical contact rods.

8. An electric power assembly for an appliance having a cooking surface, the assembly comprising:
 a heating element for raising the temperature of the cooking surface;
 a temperature sensor to sense the temperature of the cooking surface;
 a temperature controller in communication with the temperature sensor to maintain the cooking surface within a desired temperature range;
 at least one electrical contact rod operatively engaged with the appliance to supply electrical power to the heating element; and
 at least one contact receptacle configured to mate with the at least one electrical contact rod to form an electrical connection, wherein the at least one contact receptacle has a surface area proportional to the electrical power supplied to the heating element and a length at least twice the length of the at least one contact rod to prevent overheating of the power assembly.

9. The assembly of claim 8, wherein the heating element comprises:
 a wire encased within an iron material to form an iron rod having an exterior surface; and
 a stainless-steel coating layer disposed on the exterior surface of the iron rod.

10. The assembly of claim 8, wherein the sensor is positioned within an end of a hollow body extending from the temperature controller.

11. The assembly of claim 8, wherein the length of the at least one contact receptacle is approximately three times the length of the at least one contact rod.

12. The assembly of claim 11, wherein the at least one contact receptacle is lined with a brass material.

13. The assembly of claim 8, wherein the heating element comprises two contact rods and the temperature controller comprises two contact receptacles.

14. The assembly of claim 13, wherein the length of the two contact receptacles is approximately twice the length of the two contact rods.

15. The assembly of claim 14, wherein the length of the two contact receptacles is approximately three times the length of the two contact rods.

* * * * *